United States Patent [19]

Bekkala et al.

[11] Patent Number: 4,461,372
[45] Date of Patent: Jul. 24, 1984

[54] CALIPER GUIDE ASSEMBLY FOR DISC BRAKES

[75] Inventors: Andrew H. Bekkala, Orland, Calif.; Wayne H. Garrett, Troy, Mich.

[73] Assignee: Eaton Corporation, Cleveland, Ohio

[21] Appl. No.: 450,168

[22] Filed: Dec. 16, 1982

Related U.S. Application Data

[63] Continuation of Ser. No. 169,546, Jul. 17, 1980, abandoned, which is a continuation of Ser. No. 974,186, Dec. 26, 1978, abandoned.

[51] Int. Cl.³ .............................................. F16D 65/09
[52] U.S. Cl. ................................ 188/73.34; 188/73.45
[58] Field of Search ................... 188/71.1, 72.4, 72.7, 188/73.33, 73.34, 73.43, 73.44, 73.45

[56] References Cited

U.S. PATENT DOCUMENTS

| | | | |
|---|---|---|---|
| 3,391,761 | 7/1968 | Brueder | 188/73.33 |
| 3,648,807 | 3/1972 | Lottridge et al. | 188/73.43 |
| 3,905,455 | 9/1975 | Martins | 188/73.43 |
| 3,964,583 | 6/1976 | Montalvo, Jr. | 188/73.34 |
| 4,084,665 | 4/1978 | Burnett | 188/73.43 |

FOREIGN PATENT DOCUMENTS

| | | | |
|---|---|---|---|
| 1929822 | 12/1970 | Fed. Rep. of Germany | 188/73.34 |
| 2250843 | 4/1974 | Fed. Rep. of Germany | 188/73.43 |
| 2363400 | 7/1975 | Fed. Rep. of Germany | 188/73.43 |
| 2649627 | 5/1977 | Fed. Rep. of Germany | 188/73.34 |
| 2708317 | 9/1977 | Fed. Rep. of Germany | 188/73.34 |

Primary Examiner—Douglas C. Butler
Assistant Examiner—R. R. Diefendorf
Attorney, Agent, or Firm—C. H. Grace; P. S. Rulon

[57] ABSTRACT

A disc brake (10) of the floating caliper type wherein the caliper (14) is slidably mounted on the torque plate (34) by two guide pins (60) which are received in complementary grooves (62, 66) in the torque plate and caliper and which are held to the torque plate by screw bolts (74) passing through bores (72) in the adjacent portions of the torque plate. The pins and grooves have sufficient wrapping engagement to allow limited sliding movement of the caliper on the pins while precluding separation of the caliper from the pins. When one guide pin is released by unscrewing the related bolts, the caliper may be pivoted about the other pin and then removed from the torque plate.

15 Claims, 5 Drawing Figures

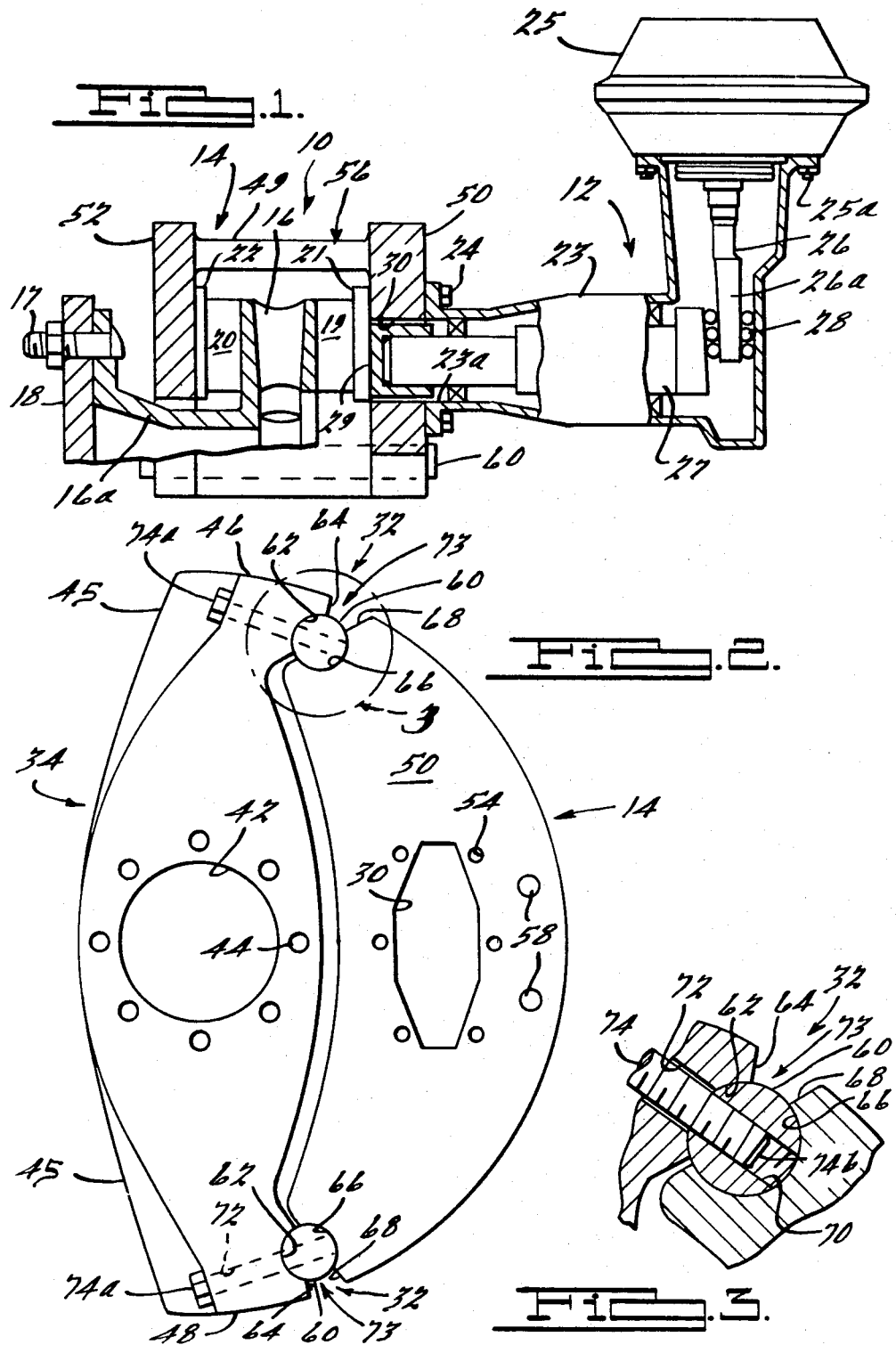

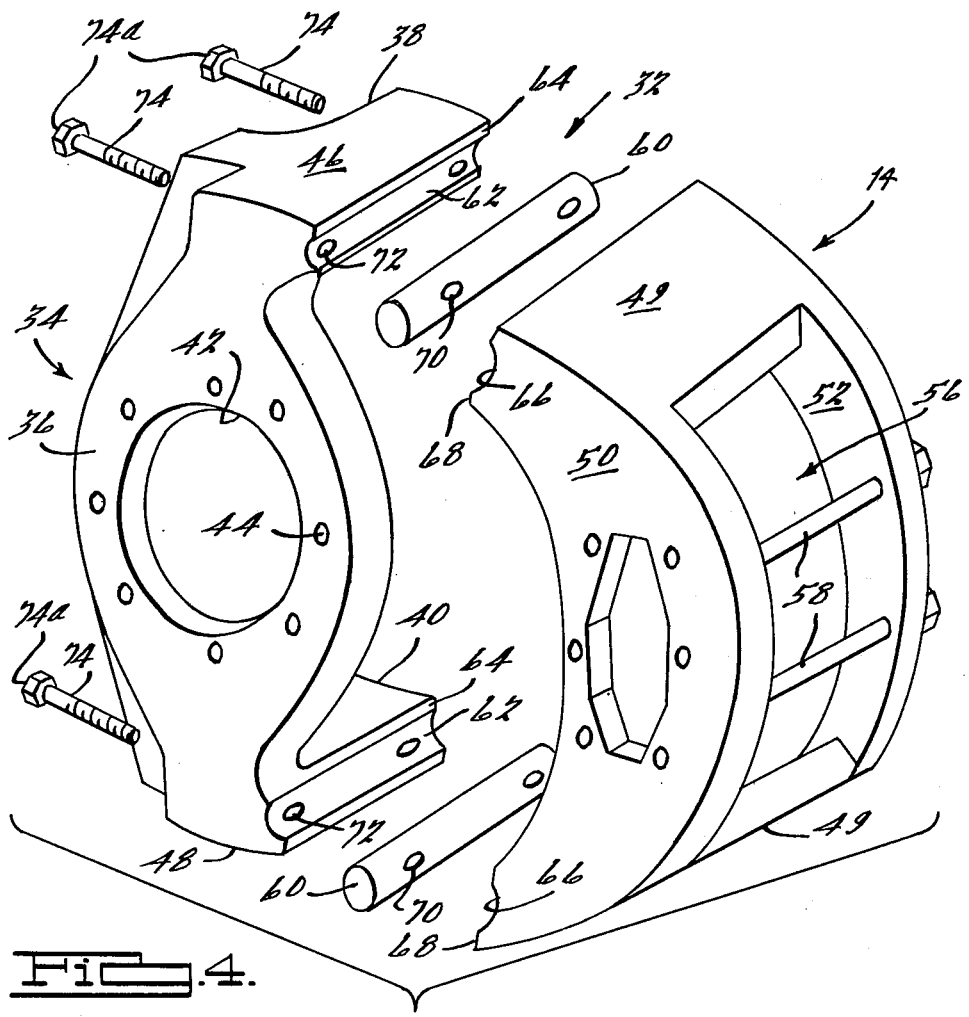
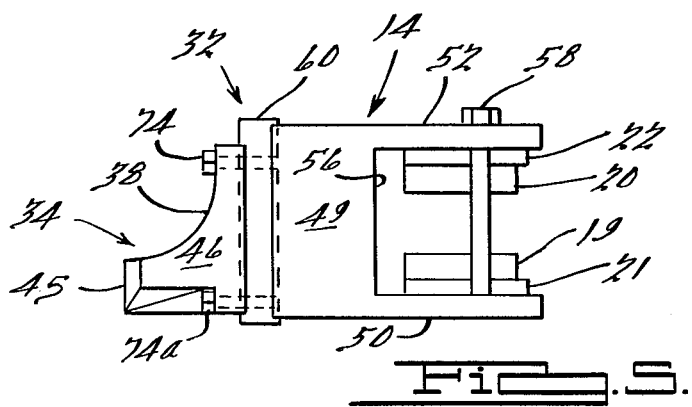

CALIPER GUIDE ASSEMBLY FOR DISC BRAKES

This is a continuation of application Ser. No. 169,546, filed July 17, 1980, abandoned, which is a continuation of original application Ser. No. 974,186, filed Dec. 26, 1978, abandoned.

BACKGROUND OF THE INVENTION

This invention relates to vehicular disc brakes of the sliding caliper type and, more particularly, to a caliper guide assembly for a sliding caliper disc brake.

In a typical sliding caliper disc brake, the caliper embraces the disc and is slideably supported at its opposite end by a torque plate fixedly secured to a non-rotating portion of the axle assembly of the associated vehicle. As the brake is applied by the actuator assembly, the brake pad driven directly by the actuator assembly, typically the inboard pad, is pressed against the inboard face of the disc, whereafter, with continued driving input from the actuator assembly, the caliper slides inboard on the torque plate to bring the outboard pad, carried by the caliper, into frictional engagement with the outboard face of the disc. The guide means for slideably mounting the caliper on the torque plate is a critical design ingredient in any sliding caliper disc brake. The guide means must be inexpensive to manufacture. It must fit within a very restricted space. It must in many cases efficiently transmit the braking forces to the torque plate. It must itself be virtually maintenance free; and must provide ready removal, and replacement, of the caliper for purposes of servicing the brake elements associated with the caliper. And it must provide a smooth, low friction slideway for the caliper over the entire life of the brake.

Most prior art guide means have involved the use of a pair of guide pins which, in door hinge fashion, pass through aligned holes in the torque plate and in the caliper to retain the caliper on the torque plate while allowing the caliper to slide axially on the guide pins. This guide means design, while broadly satisfactory in general application, has several disadvantages. Specifically, this design tends to be rather intricate and therefore expensive to manufacture. This design also requires axial withdrawal of the pins to accomplish removal of the caliper for servicing—a procedure that can be quite awkward, especially in heavy duty truck applications where adjacent equipment severely encroaches on the space available around the brake. These hinge type pins—and the holes through which they pass—also tend to plug up and corrode, thereby impeding the smooth sliding movement of the caliper during the braking operation and requiring a periodic maintenance operation and expense directly predicated on the guide means design. Various other guide means designs have been proposed in an attempt to eliminate or diminish the described disadvantages of the hinge type design. However, these other designs, broadly considered, have achieved diminution of the disadvantages of the hinge type design only at the expense of generating other disadvantages such, for example, as increased complexity, increased manufacturing cost, decreased effectiveness in transmitting the braking forces to the torque plate, and increased resistance to the sliding movement of the caliper.

SUMMARY OF THE INVENTION

Accordingly, it is an object of the present invention to provide an improved guide means for the sliding caliper of a vehicular disc brake.

A more specific object is to provide such a guide means which is simple in design and efficient in operation, and which facilitates removal and replacement of the caliper for servicing purposes.

According to an important feature of the invention, the caliper is slideably and pivotally mounted at one end on the torque plate, and the other end of the caliper is mounted on the torque plate by a rail and groove arrangement which normally allows only sliding movement of the caliper on the torque plate but which, in response to release of the rail, and without axial movement of the rail, allows the caliper to pivot about its other end on the torque plate member.

According to a further feature of the invention, the pivotal connection between the torque plate and the caliper is arranged to allow the caliper to be separated from the torque plate following pivotal movement of the caliper about the pivotal connection. This arrangement allows the caliper to be removed for servicing by simply releasing the rail mounting the other end of the caliper and pivoting the caliper about its one end. The caliper is thus removed by a very simple operation which requires a minimum of dexterity and physical strength and which eliminates the necessity of providing clearance around the brake for axial withdrawal of hinge pins.

According to a further feature of the invention, the pivotal mounting of the one end of the caliper, and the rail and groove mounting of the other end of the caliper, each comprise a rail releasably secured to the torque plate and slideably received in a groove on the caliper member. The grooves have sufficient wrapping engagement with the rails to normally allow only sliding movement of the caliper on the rails but, following release of one rail from the torque plate, the caliper is free to pivot about a fulcrum defined by the other rail. This arrangement allows the same mounting means to be used at both ends of the caliper and thereby allows the same caliper and torque plate assembly to be used for both left side and right side vehicle applications.

According to a further feature of the invention, each rail comprises a guide pin formed as a length of round bar stock, and the grooves have a complementary arcuate configuration. This arrangement allows the use of standard bar stock and standard circular or planar machining techniques.

According to yet another feature of the invention, each guide pin has threaded transverse bores and is seated in an arcuate groove seat in the torque plate, through bores are provided in the torque plate which open in the arcuate groove seats, and each guide pin is releasably secured to the torque plate by bolts passing through the through bores for threaded engagement with the threaded bores in the pin. This arrangement further extends the use of standard circular hardware and machining techniques and allows the caliper to be removed for servicing simply by loosening the bolts associated with one guide pin and thereafter pivoting the caliper about the other guide pin.

These and other features and advantages of the invention will become apparent from the following detailed description of a preferred embodiment of the invention and from the accompanying drawings.

BRIEF DESCRIPTION OF THE DRAWINGS

FIG. 1 is a somewhat schematic, partially fragmentary view of a vehicular disc brake assembly embodying the invention caliper guide assembly;

FIG. 2 is a view on an enlarged scale of the caliper guide assembly seen fragmentarily in FIG. 1;

FIG. 3 is a view on a yet further enlarged scale of the portion of the caliper guide assembly included within the circle 3 of FIG. 2;

FIG. 4 is a perspective exploded view of the caliper guide assembly of FIG. 2; and FIG. 5 is a fragmentary top view of the caliper guide assembly of FIGS. 3 and 4.

DESCRIPTION OF THE PREFERRED EMBODIMENT

The vehicle brake assembly of FIG. 1 includes a caliper disc brake assembly 10 and an associated actuator assembly 12.

Caliper disc brake assembly 10 includes a caliper 14 adapted to be slideably mounted on a fixed portion (e.g., a torque plate secured to the axle assembly) of an associated vehicle, a disc 16 embraced by caliper 14 and having a flange portion 16a secured as by bolts 17 to a wheel 18 of an associated vehicle, and inboard and outboard brake pads 19 and 20 having backing plates 21 and 22.

Actuator assembly 12 includes a generally L-shaped housing 23 secured at one end by bolts 24 to the inboard face of caliper 14, an air motor 25 secured to the other end of housing 23 by bolts 25a, a wedge actuator member 26 driven by the air motor, and a tappet 27 driven by a wedge portion 26a of actuator member 26 through roller bearing assemblies 28. The free end 27a of tappet 27 extends through opening 23a in housing 23 and is received in a bridge bar 29 which in turn passes through an opening 30 in caliper 14 to act against backing plate 21 of inboard brake pad 19 to press pad 19 against the inboard face of disc 16 and thereafter slide the caliper inboard, or to the right as viewed in FIG. 1, to in turn apply outboard pad 20, carried by the caliper, against the outboard face of disc 16, whereby to brake wheel 18 of the associated vehicle, all in known manner.

The present invention relates particularly to the manner in which caliper 14 is slideably mounted on the fixed portion of the associated vehicle and, more particularly, to the guide means for mounting the caliper on the torque plate of the associated axle assembly for limited sliding translatory movement on the torque plate in a direction generally parallel to the axis of the axle assembly.

This guide means, seen generally at 32 in FIGS. 2–5, is interposed between the opposite ends of caliper 14 and a torque plate 34.

Torque plate 34 may take various forms. As disclosed, torque plate 34 is formed as a unitary ferrous casting and includes a central plate-like portion 36 and end portions 38 and 40. Central portion 36 includes a central aperture 42 for passing the axle housing or axle spindle (not shown) of an associated vehicle and a plurality of circumferentially spaced bolt holes 44 for securing the torque plate to a flange on the axle housing or axle spindle. End portions 38 and 40 extend outboard from central portion 36 in cantilever fashion to give the torque plate a generally U-shaped appearance. The radially outer surfaces 46 and 48 of end portions 38 and 40 comprise arcuate surfaces centered on the centerline of aperture 42. Reinforcing rib portions 45 blend at their radially inner ends with central portion 36 and, at their radial outer ends, form a portion of arcuate surfaces 46 and 48.

Caliper 14 may also take various forms. As disclosed, caliper 14 is formed as a unitary ferrous casting. Caliper 14, in transverse cross section, has a C-shaped configuration and includes an arcuate central (or back) portion 49 lying on an arc centered on aperture 42, and inboard and outboard web portions 50 and 52. Outboard web portion 52 has a smaller radial dimension than inboard portion 50 to facilitate clearance of disc 16 (FIG. 1), and inboard web portion 50 defines oblong opening 30 passing bridge bar 29. A plurality of bolt holes 54 spaced around opening 30 receive bolts 24 to secure actuator assembly 12 to caliper 14. Caliper 14 is of the "open back" type, i.e., the "back" portion 49 of the caliper is "open", as at 56, so that pads 19 and 20 together with backing plates 21 and 22 may be removed for replacement, without removing caliper 14, simply by removing a pair of bolts 58. Bolts 58 pass through caliper web portion 52 and through suitable holes in backing plates 21, 22 for threaded engagement with threaded through bores in caliper web portion 50. As is typical of "open back" caliper designs, the caliper of the invention has a considerable arcuate extent as compared to "closed back" designs. As shown, caliper 14 has an arcuate extent, as scribed from the center of aperture 42, of approximately 130 degrees.

Guide means 32, broadly considered, includes a pair of guide pins or rails 60; groove seats 62 formed in the axially extending end faces 64 of torque plate end portions 38, 40; and grooves 66 formed in the axially extending end faces 68 of caliper 14.

Guide pins 60 are formed of round bar stock and may, for example, be cut from one inch diameter high carbon steel bar stock having a Rockwell C of between 30 and 35. The pins are preferably coated (with a lubrite phosphate e.g) to provide and retain lubricity and discourage corrosion. Each pin is provided with two axially spaced threaded through bores 70. Each pin has a length approximately equal to the sum of the axial length of one of torque plate end portions 38, 40 plus the thickness of pads 19, 20.

Groove seats 62 extend the entire axial length of torque plate end portions 38, 40 and have a cross sectional configuration complementary to guide pins 60, i.e., if pins 60 are formed of one inch bar stock, groove seats 62 would be formed with a circular cross section having a radius slightly greater than one half inch so that the pins may seat firmly and confortably in the groove seats. Groove seats 62 preferably have an arcuate extent of approximately 120 degrees. A pair of through bores 72 are provided in each torque plate end portion. Bores 72 open at one end at opposite sides of ribs 45 and open at their other ends in groove seat 62. Bores 72 are axially spaced the same distance as threaded bores 70 in pins 60.

Grooves 66 extend the entire axial length of caliper 14. Caliper 14, as seen in FIG. 5, has an axial length somewhat greater than that of torque plate end portions 38, 40 and somewhat less than that of pins 60. Grooves 66 have a cross sectional configuration complementary to guide pins 60 and generally conforming in radius to groove seats 62. Grooves 66 preferably have an arcuate extent of approximately 180 degrees, leaving an angular gap 73 of approximately 60 degrees between the radially outer portion of caliper end faces 68 and the confronting torque plate end faces 64.

Each pin 60 is held in its seated disposition in the respective groove 62 by a pair of fastener bolts 74 which pass through through bores 72 for threaded engagement with the threaded bores 70 provided in the pin 60. The heads 74a of bolts 74 seat against the torque plate end portions at opposite sides of ribs 45 and the bolts have a length such that, with bolt heads 74a seated firmly against the torque plate and the pins 60 firmly seated in the groove seats 62, the free ends 74b of bolts 74 terminate within threaded bores 70.

Grooves 66 have sufficient wrapping engagement with pins 60 such that, with both pins 60 firmly fastened to the torque plate by bolts 74, caliper 14 is free to slide axially on pins 60 but is precluded from any other movement relative to the torque plate. If, however, either pin 60 is released from the torque plate by loosening of the related fastener bolts 74, the caliper may be pivoted on the fulcrum, or pivot axis, provided by the other pin. For example, if the upper pin 60 of FIG. 2 is released by loosening upper fastener bolts 74, caliper 14 may be pivoted downwardly about the fulcrum provided by lower pin 60 until upper pin 60 is carried by the pivoting upper end of caliper 14 to a position in which it is clear of groove seat 62, whereafter the lower end of caliper 14 may be lifted off of lower pin 60 and the entire caliper, together with the associated actuator assembly, may be removed for appropriate servicing. The gap 73 associated with the upper pin 60 functions to allow that pin to pivot clear of groove seat 62 upon loosening of upper bolts 74, and the gap 73 associated with the lower pin 60 closes up in response to pivotal movement about the lower pin to allow and delimit such pivotal movement. Replacement of the caliper and associated actuator assembly is readily accomplished by seating upper pin 60 loosely in upper caliper groove 66, seating lower caliper groove 66 on lower pin 60, pivoting the caliper upwardly about the fulcrum provided by lower pin 60 until upper pin 60 seats in upper torque plate groove seat 62, and thereafter tightening upper bolts 74. If desired, coacting keying elements (not shown) may be provided on pins 60 and in grooves 66 to ensure that upper pin 60, when placed in upper caliper groove 66, is properly angularly oriented with respect to that groove so that the threaded bores 70 in the pin will be axially aligned with the through bores 72 in the torque plate upon arrival of the upper pin at its seated position in upper torque plate groove seat 62. It will be apparent that the disclosed caliper-torque plate assembly may be used for either left or right wheel installations with the upper guide pin 60 of one installation becoming the lower guide pin 60 in the other installation and vice versa.

It will be seen that the present invention provides a guide means for the sliding caliper of a vehicular disc brake which is simple in design and efficient in operation. Specifically, the invention caliper guide means allows removal of the caliper for maintenance without necessity of axial withdrawal of the guide pins; allows removal and replacement of the caliper in a simple, basically one step operation requiring a minimum of dexterity and physical strength; allows the use of standard bar stock and standard circular or planar machining techniques; and provides a design which discourages corrosion or plugging of the guide means to thereby minimize maintenance caused by the guide means itself.

Whereas a preferred embodiment of the invention has been illustrated and described in detail, it will be apparent that various changes and modifications may be made in the preferred embodiment without departing from the scope or spirit of the invention.

We claim:

1. In a vehicular disc brake of the type including a torque plate member adapted to be fixedly secured to a nonrotating portion of an axle assembly of an associated vehicle, a caliper member adapted to embrace a brake disc, and guide means mounting said caliper member on the torque plate member for limited sliding translatory movement on the torque plate member in a direction generally parallel to the axis of the vehicle axle, the improvement wherein said guide means comprises:
    means mounting one end of said caliper member for pivotal movement on said torque plate member about an axis generally parallel to the axle axis while allowing such limited sliding movement of the caliper member on the torque plate member;
    means, including a rail totally detached from said mounting means and releasably secured to one of said members in a position extending parallel to the axle axis but spaced from said pivotal axis and axially extending groove means on the other of said members slidably receiving said rail, operative with said rail secured to said one member to allow such limited sliding movement of said caliper member on said torque plate member while retaining said caliper member against any other movement relative to said torque plate member and operative in response to release of said rail from said one member to allow said caliper member to be pivoted on said torque plate member about said pivot axis;
    said mounting means being operative, in response to pivotal movement of said caliper member about said pivot axis, to allow separation of said caliper member from said torque plate member at said one caliper member end, whereby to allow removal of said caliper member from said torque plate member; and
    the means releasably securing said rail to said one member being operative to release said rail from said one member without axial movement of said rail, or of said releasably securing means, relative to said one member.

2. A disc brake according to claim 1 wherein: said one member is said torque plate member.

3. A disc brake according to claim 2 wherein: said rail comprises a guide pin of circular cross section and said groove means has a complementary configuration.

4. A disc brake according to claim 3 wherein: said mounting means comprises a second guide pin of circular cross section which is releasably secured to said torque plate member by threaded fastener means carried by said torque plate member and which is received in second groove means of circular cross section defined on said one end of said caliper member.

5. A disc brake according to claim 1 wherein: said rail is releasably secured to said one member by threaded fastener means carried by said one member and threadably engaging said rail.

6. A disc brake according to claim 5 wherein: said rail comprises a guide pin of circular cross section and said groove means has a complementary configuration.

7. A disc brake according to claim 6 wherein:
said rail means each comprise a guide pin of generally circular cross section seated in an arcuate groove seat defined on said torque plate member; and
said groove means are defined on said caliper member and have a configuration complementary to the circular guide pins.

8. A disc brake according to claim 1 wherein:
said mounting means comprises a second rail releasably secured to said one member and received in second groove means defined on said other member.

9. In a disc brake of the type including a torque plate member adapted to be fixedly secured to a nonrotating portion of an axle assembly of an associated vehicle, a caliper member adapted to embrace a brake disc, and guide means mounting said caliper member on the torque plate member for limited sliding translatory movement on the torque plate member in a direction generally parallel to the axis of the vehicle axle, the improvement wherein said guide means comprises:
rail means defined on one of said members at two spaced locations thereon and each extending parallel to the axle axis;
spaced open, axially extending groove means defined on the other of said members slideably receiving said rail means and having sufficient wrapping engagement therewith to allow such limited sliding movement of said caliper member on said torque plate member while retaining said caliper member against any other movement relative to said torque plate member; and
means, including means releasably securing one of said rail means to said one member, operative in response to release of said one rail means from said one member to allow said caliper member to be pivoted on said torque plate member about a fulcrum defined by the other rail means and the associated groove means.

10. A disc brake according to claim 9 wherein:
said rail means each comprise a guide pin of generally circular cross section and said groove means have a complementary configuration.

11. A disc brake according to claim 10 wherein:
said guide pins are secured to said torque plate member.

12. A disc brake according to claim 11, wherein said guide pins transmit braking forces from said caliper member to said torque plate member.

13. A disc brake according to claim 9, wherein said rail means transmit braking forces from said caliper member to said torque plate member.

14. In a disc brake of the type including a torque plate member adapted to be fixedly secured to a nonrotating portion of an axle assembly of an associated vehicle, a caliper member adapted to embrace a brake disc, and guide means mounting said caliper member on the torque plate member for limited sliding translatory movement on the torque plate member in a direction generally parallel to the axis fo the vehicle axle, the improvement wherein said guide means comprises:
two spaced groove seats and through-bores opening into said groove seats
two separate rail means seated in said groove seats and extending parallel to the axis, each rail means having threaded transverse bores therein;
spaced, open, axially extending groove means defined on the other of said members respectively slideably receiving said rail means and having sufficient wrapping engagement therewith to allow such limited sliding movement of said caliper members on said torque plate member while retaining said caliper member against any other movement relative to said torque plate member; and
a plurality of bolts passing through said throughbores for threaded engagement with said transverse bores to releasably secure said rail means in said groove seats and operative in response to release of one of said rail means to allow said caliper member to be pivoted on said torque plate about a fulcrum defined by the other rail means and the associated groove means.

15. A disc brake according to claim 14, wherein said rail means transmit braking forces from said caliper member to said torque plate member.

* * * * *